(12) United States Patent
Havener

(10) Patent No.: US 6,234,116 B1
(45) Date of Patent: May 22, 2001

(54) HEAT RETAINING DOG HOUSE

(76) Inventor: Richard Havener, 5945 Happy Valley Rd., Verona, NY (US) 13478

( * ) Notice: Subject to any disclaimer, the term of this patent is extended or adjusted under 35 U.S.C. 154(b) by 0 days.

(21) Appl. No.: 09/332,411

(22) Filed: Jun. 14, 1999

(51) Int. Cl.[7] .................................................. A01K 1/02
(52) U.S. Cl. ........................... 119/482; 119/452; 119/484
(58) Field of Search ................................. 119/482, 452, 119/484; 220/4.26, 4.27, 23.87, 23.88, 8; 229/120.1

(56) References Cited

U.S. PATENT DOCUMENTS

| | | | |
|---|---|---|---|
| 2,312,846 | * | 3/1943 | Olvey . |
| 3,703,159 | * | 11/1972 | Rose-Miller . |
| 4,140,080 | * | 2/1979 | Snader . |
| 4,396,144 | * | 8/1983 | Gutierrez et al. . |
| 5,009,326 | * | 4/1991 | Reaves et al. ........................ 220/441 |
| 5,651,331 | * | 7/1997 | Cleri, Jr. ................................ 119/484 |
| 5,769,028 | * | 6/1998 | Deckys .................................. 119/496 |

* cited by examiner

Primary Examiner—Charles T. Jordan
Assistant Examiner—Yvonne R. Abbott
(74) Attorney, Agent, or Firm—George R. McGuire; Hancock & Estabrook, LLP

(57) ABSTRACT

A selectively controlled heat retaining dog house comprised of a standard framing structure in which variably sized, modular housing inserts may be positioned. Each of the housing inserts have essentially the same exterior length and width dimensions so as to properly fit within the framing structure. The interior dimensions, however, vary so as to provide a plurality of differently sized rooms which can be employed throughout the year. As the less space a dog has inside his or her house, the more heat is retained, having the option of changing the amount of space a given dog has in his or her house permits the dog's master to selectively control the temperature of the dog's house.

13 Claims, 8 Drawing Sheets

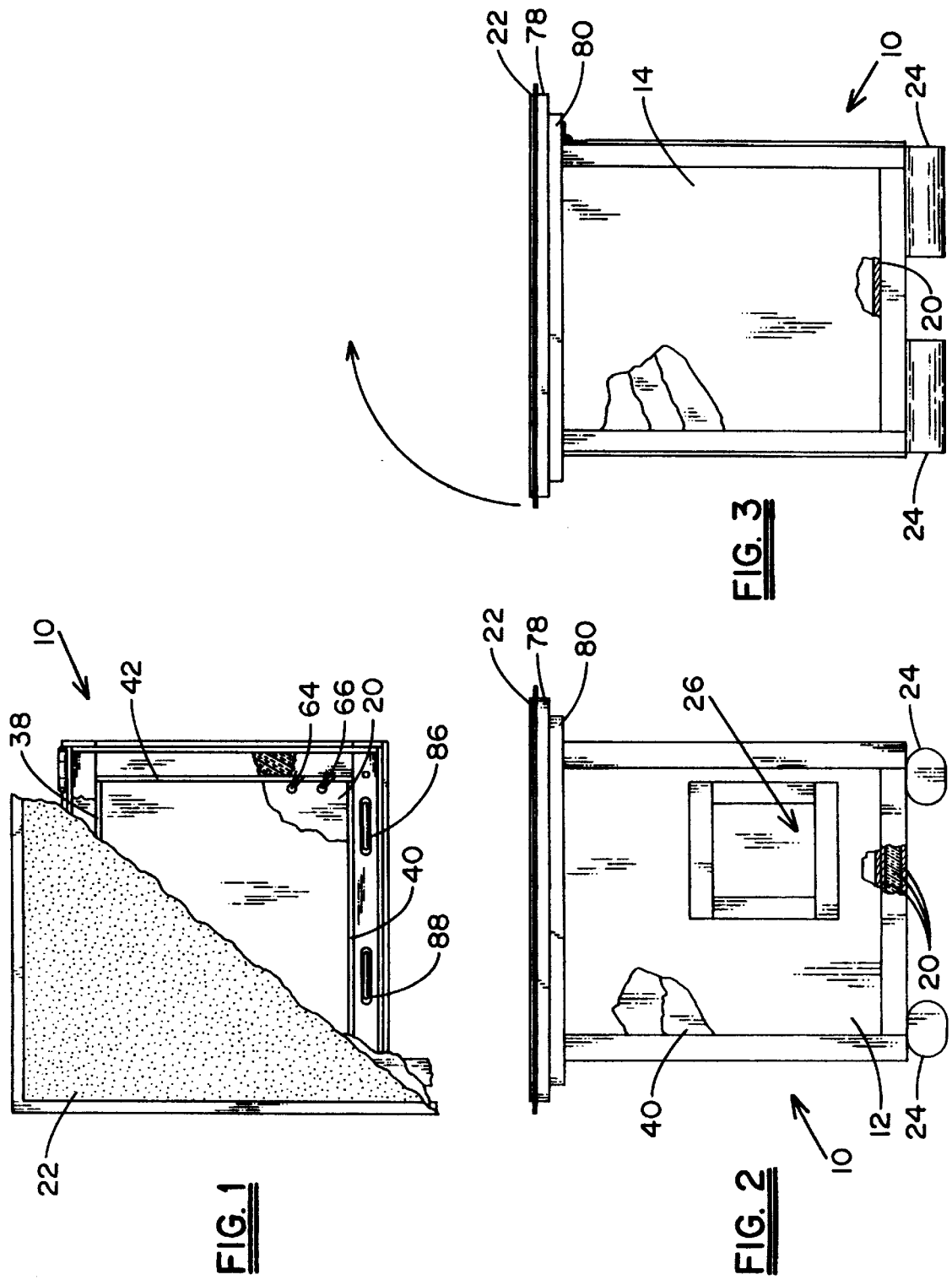

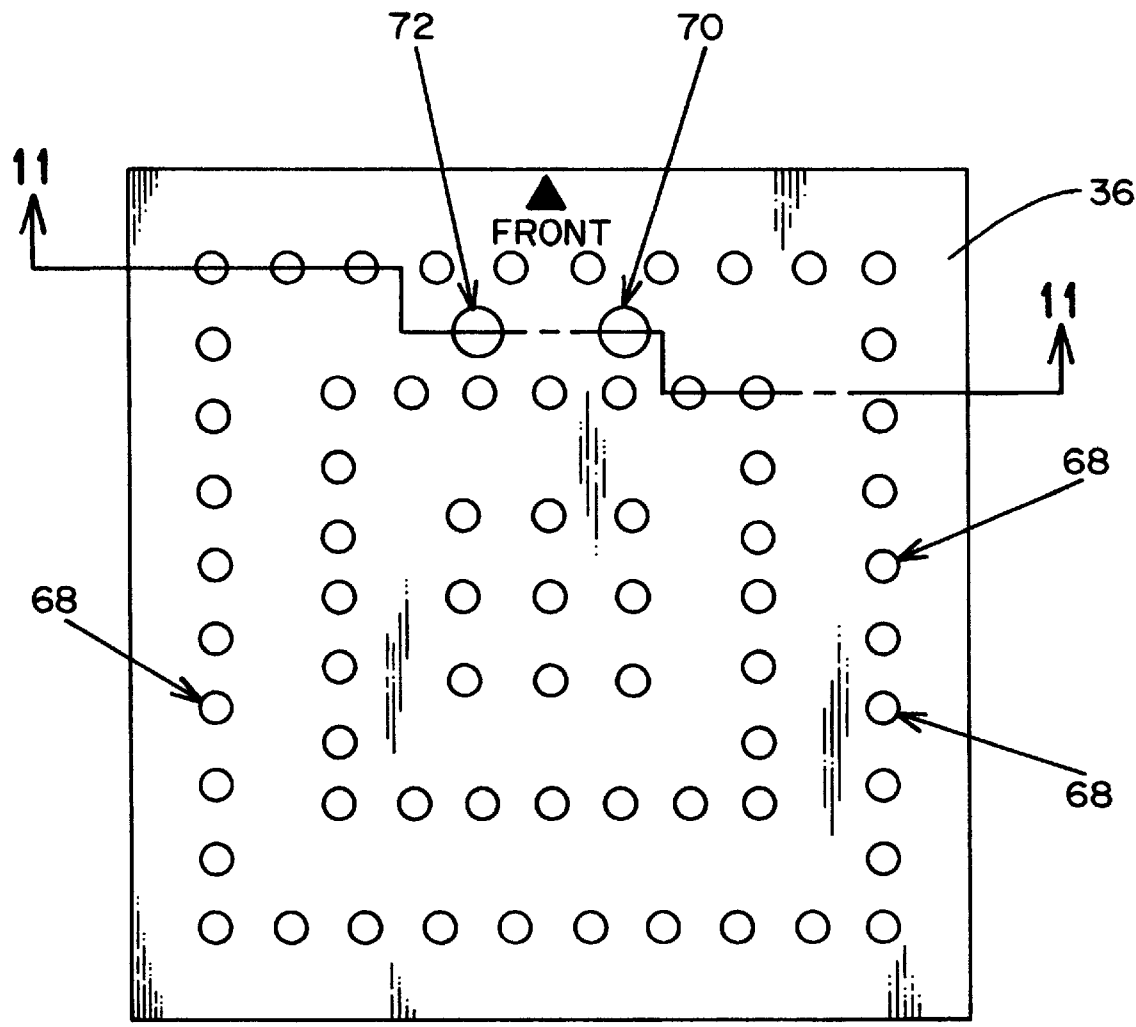

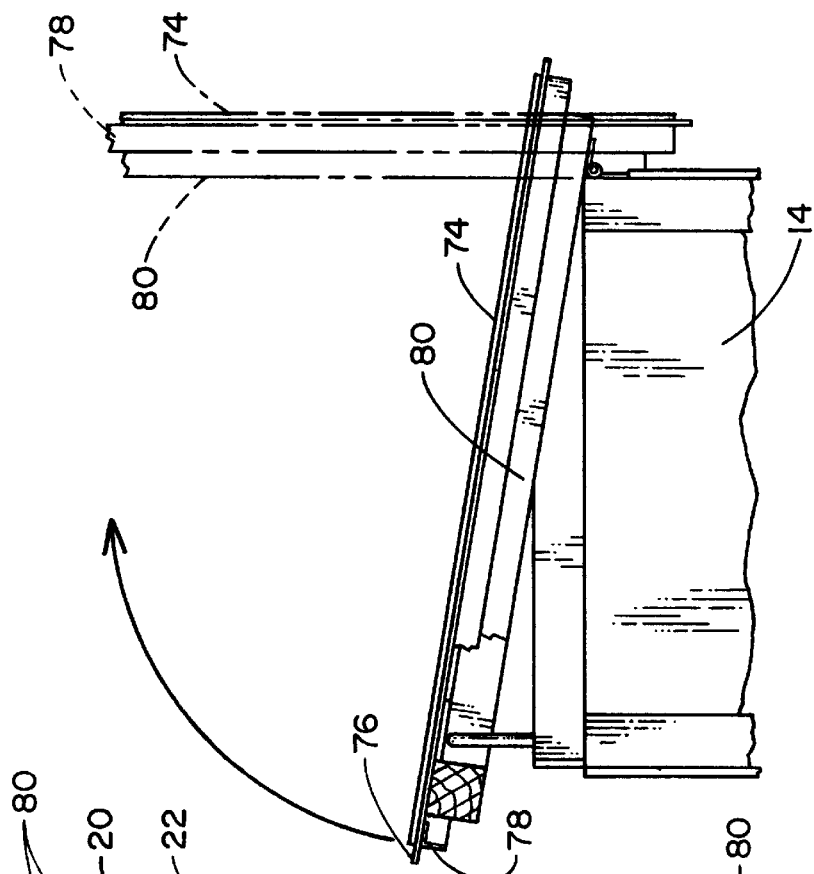
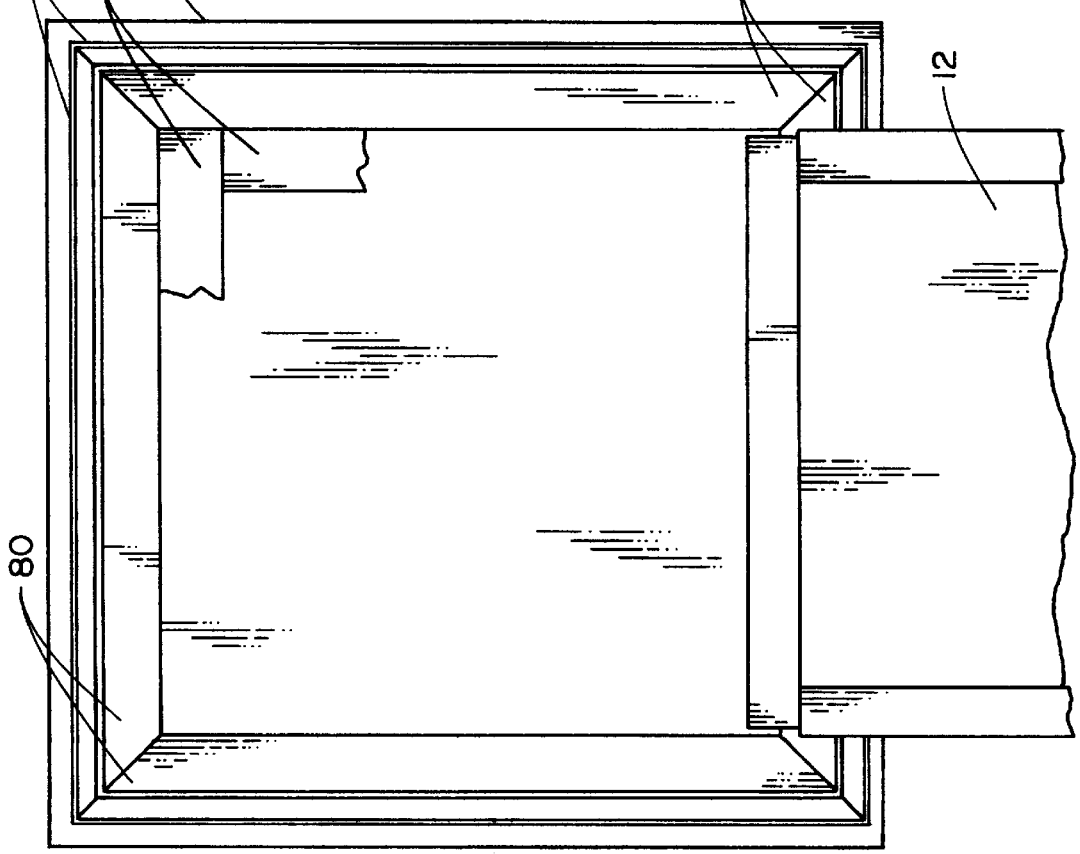

ial Housing

HEAT RETAINING DOG HOUSE

BACKGROUND OF THE INVENTION

The present invention generally relates to animal housing and, more particularly, to dog houses having selectively controllable, heat retention properties.

Dog houses are typically employed with dogs who are kept outside of their master's house for prolonged periods of time. Generally, dog houses are simple structures comprised of a frame, wooden boards attached to the framing so as to enclose the structure, and some weather protective coating placed on the outwardly facing surfaces of the boards to prevent degradation of the structure. The houses, however, are not insulated or at most, contain hay or some form of bedding positioned therein to retain heat.

It is therefore a principal object and advantage of the present invention to provide a dog house that includes selectively controllable heat retention properties.

It is another object and advantage of the present invention to provide a dog house that will result in less food consumption by the dog living therein.

Other objects and advantages of the present invention will in part be obvious and in part appear hereinafter.

SUMMARY OF THE INVENTION

In accordance with the foregoing objects and advantages, the present invention provides a dog house comprised of a standard framing structure in which variably sized, modular housing inserts may be positioned. Each of the housing inserts have essentially the same exterior length and width dimensions so as to properly fit within the framing structure. The interior dimensions, however, vary so as to provide a plurality of differently sized rooms which can be employed throughout the year. As the less space a dog has inside his or her house, the more heat is retained, having the option of changing the amount of space a given dog has in his or her house permits the dog's master to selectively control the temperature of the dog's house.

In addition to the modular housing inserts, the present dog house invention includes a hinged roof that may be propped open with a peg, and that is pivotally movable between fully open and fully closed positions. In order to change the modular housing insert, a dog's master would position the roof in its fully open position in order to easily gain access to the interior.

Positioned in direct, covering relation to the modular housing insert is a cover. The present invention provides two covers, either of which may be securely positioned over the housing insert. One cover is perforated with a plurality of holes to permit the passage of air into and out of the house. The other cover is substantially solid so as to prohibit the escape of air from the interior of the insert.

To further facilitate the insulating properties of the house, it is set on four legs so as to raise the floor of the house a predetermined distance above the ground, thereby limiting the heat transfer to the house from the ground.

To add further comfort and heat retention to the house, various forms of conventional bedding may be placed on the floor. Such types of bedding could include, for example, treated pads, wood shavings, saw dust and the like. The raised floor of the house facilitates maintaining this bedding warm and dry condition.

BRIEF DESCRIPTION OF THE DRAWINGS

The invention will be further described and better understood in the following Detailed Description when read in conjunction with the accompanying drawing figures, wherein:

FIG. 1 is a top plan view of the present invention with portions cut away to show the interior of the house;

FIG. 2 is a front elevational view of the present invention with a portion, cut away to show certain interior features;

FIG. 3 is a side elevational view of the present invention with portions cut away to show certain internal features;

FIG. 10 is a top plan view of a perforated removable insert covering of the present invention;

FIG. 11 is a cross-sectional view taken along section line 11—11 of FIG. 10;

FIG. 14 is a top plan view of the present invention showing the roof in its fully open position;

FIG. 15 is a partial, side-elevational view of the present invention showing, in solid, the roof in its propped open position.

DETAILED DESCRIPTION

Figure 4:
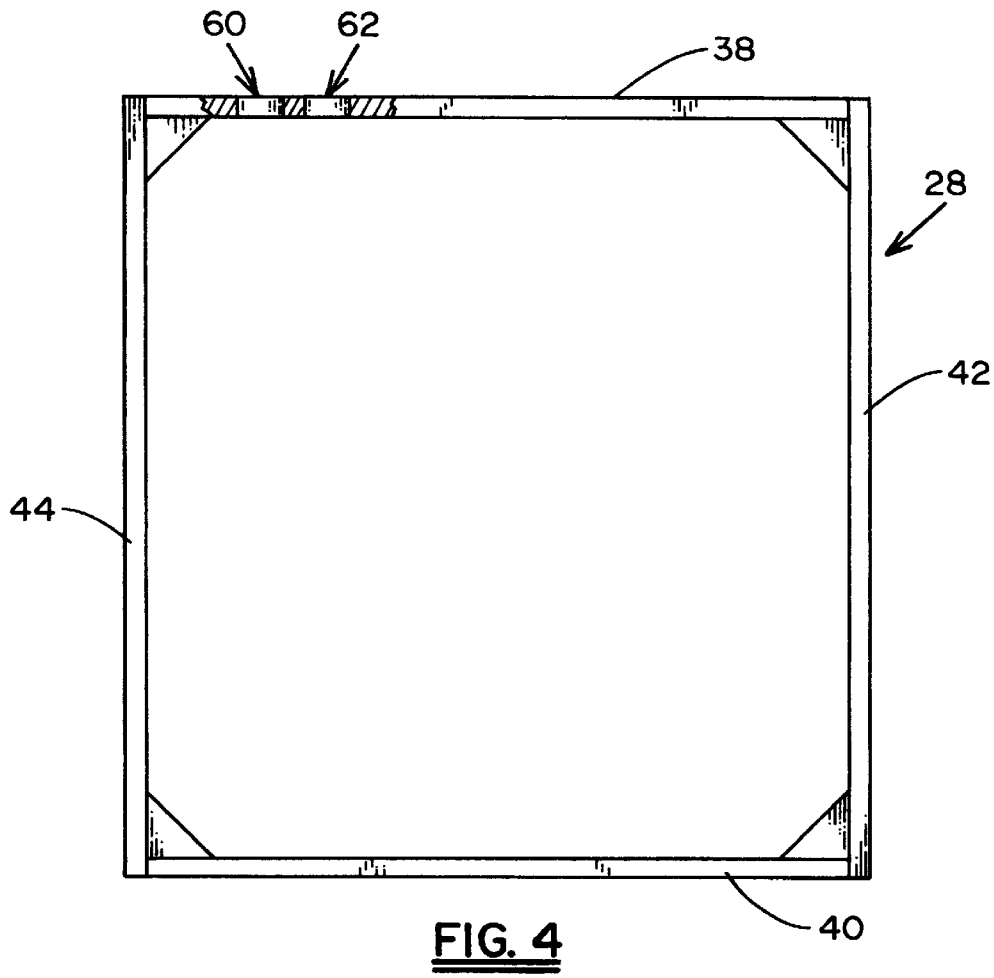
FIG. 4 is a top plan view of a first, modular housing insert of the present invention.

Referring now to the drawing figures, wherein like reference numerals refer to like parts throughout, there is seen in FIGS. 1–16 a dog house denoted generally by reference number 10. Dog house 10 generally includes an enclosed structure defined by a front wall 12, opposing side walls 14 and 16, rear wall 18, floor boards 20, which define the framing for a floor, and a roof 22 pivotally connected to rear wall 18 and movable between terminal closed and open positions. House 10 includes feet 24 which maintain floor 20 a predetermined distance above the ground. An opening 26 formed through front wall 12 permits ingress and egress into and out of house 10. The internal cavity 27 defined by walls 12, 14, 16 and 18, floor boards 20 and roof 22 is a predetermined dimension. The best mode of the practicing present invention provides a plurality of modular housing inserts 28, 30 and 32 (three inserts are shown, it being understood that fewer or more could be provided) which are removably positioned within the cavity, and a solid cover 34 or a perforated insert cover 36 either of which may be removably positioned in covering relation to inserts 28, 30, and 32. By selectively utilizing inserts 28, 30, and 32, as well as cover 34 or cover 36, the heat retention properties and climate of house 10 can be selectively controlled and made comfortable for a dog.

Figure 6:
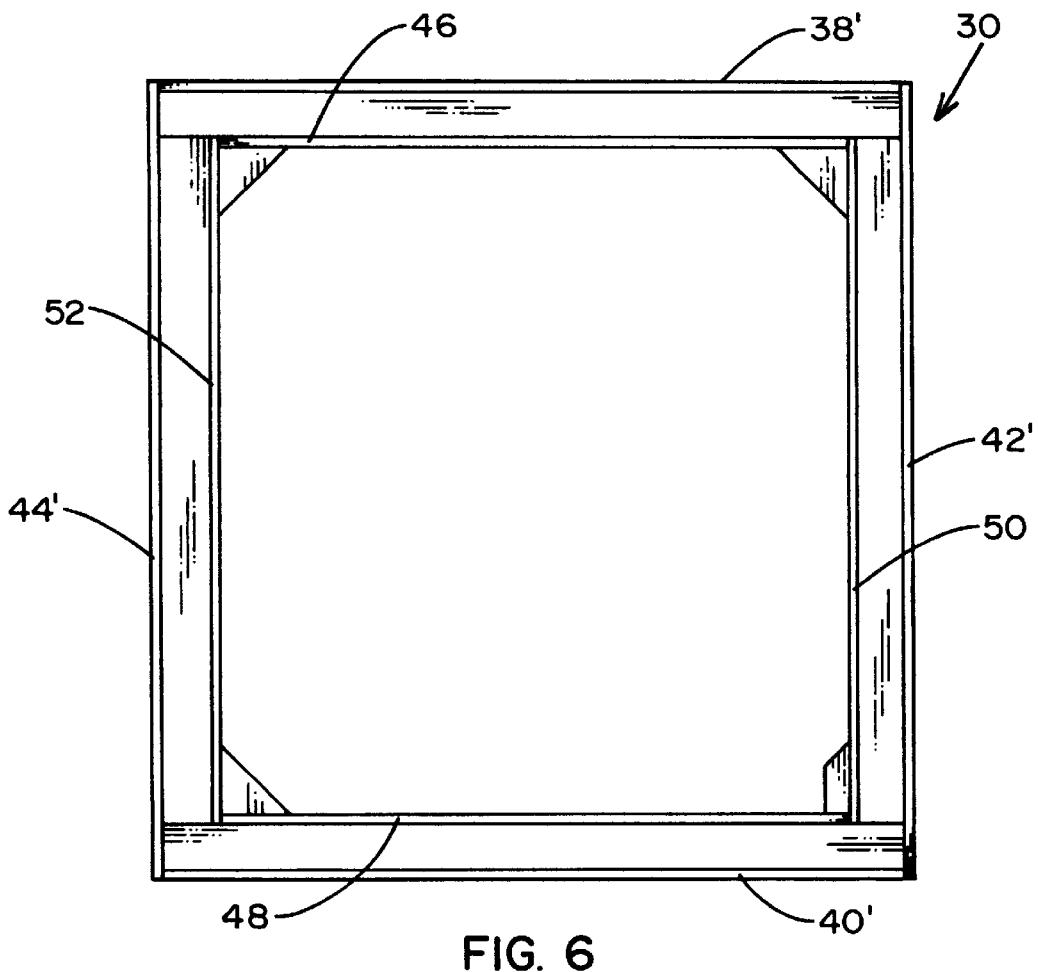
FIG. 6 is a top plan view of a second, modular housing insert of the present invention.
Figure 7:
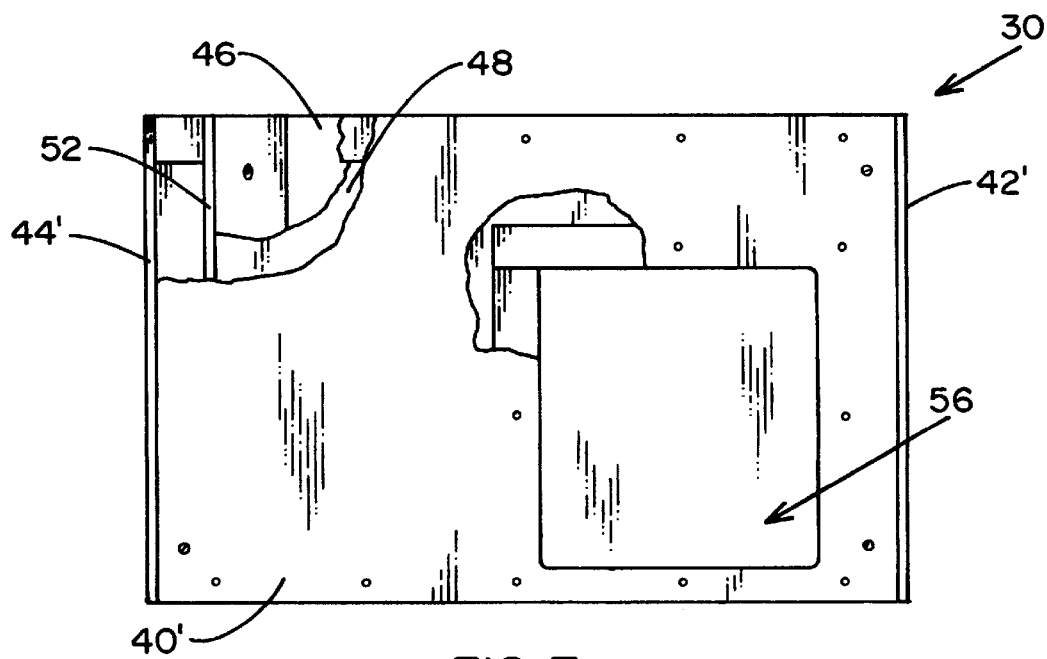
FIG. 7 is a front elevational view thereof with portions cut away to reveal certain internal features.
Figure 8:
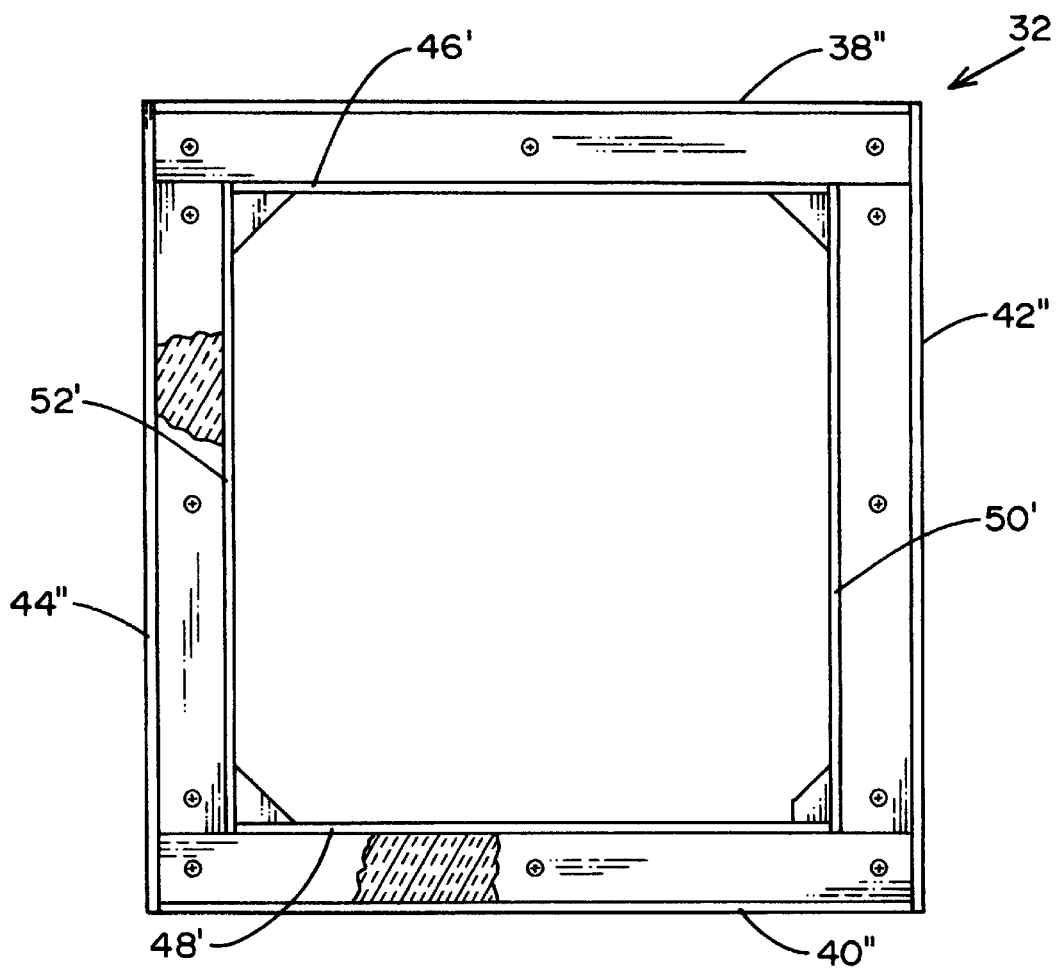
FIG. 8 is a top plan view of a third, modular housing insert of the present invention.
Figure 9:
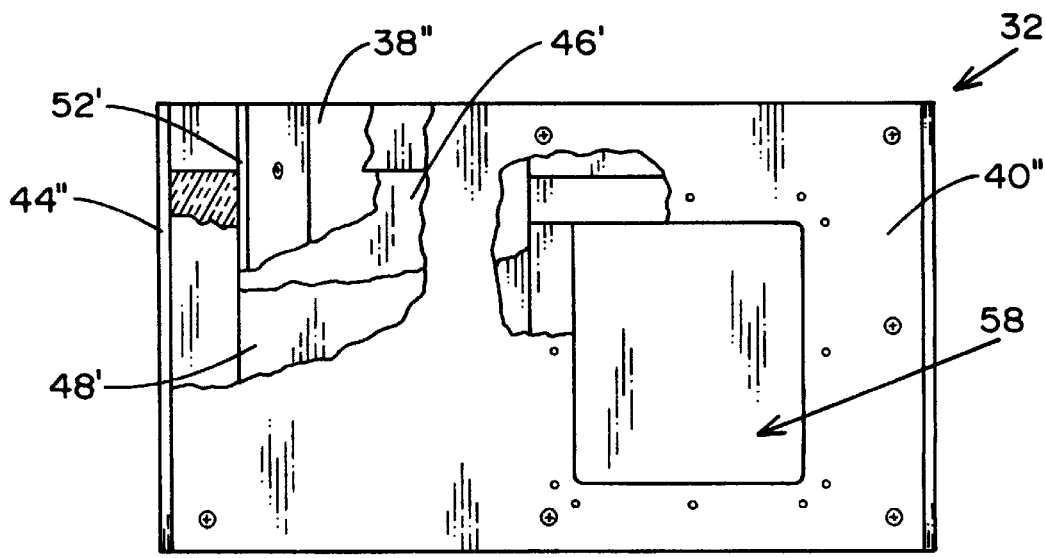
FIG. 9 is a front elevational view thereof with portions cut away to reveal certain internal features.
Figure 12:
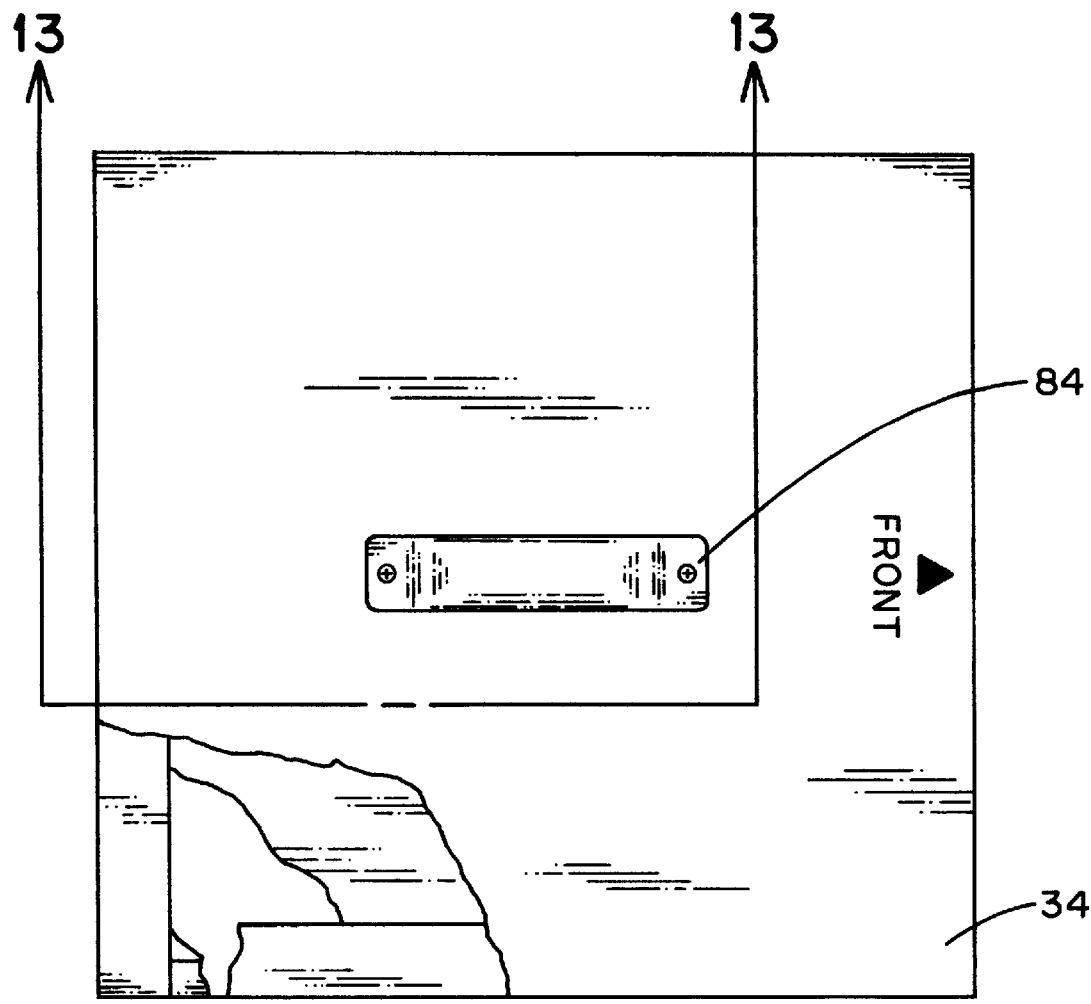
FIG. 12 is a top plan view of the roof of the present invention with portions cut away to reveal certain internal features.
Figure 13:
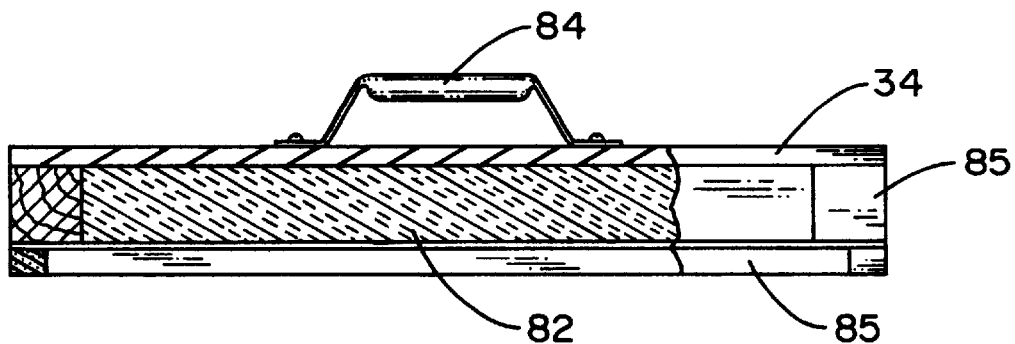
FIG. 13 is a cross-sectional view taken along section lines 15—15 of FIG. 14.
Figure 16:
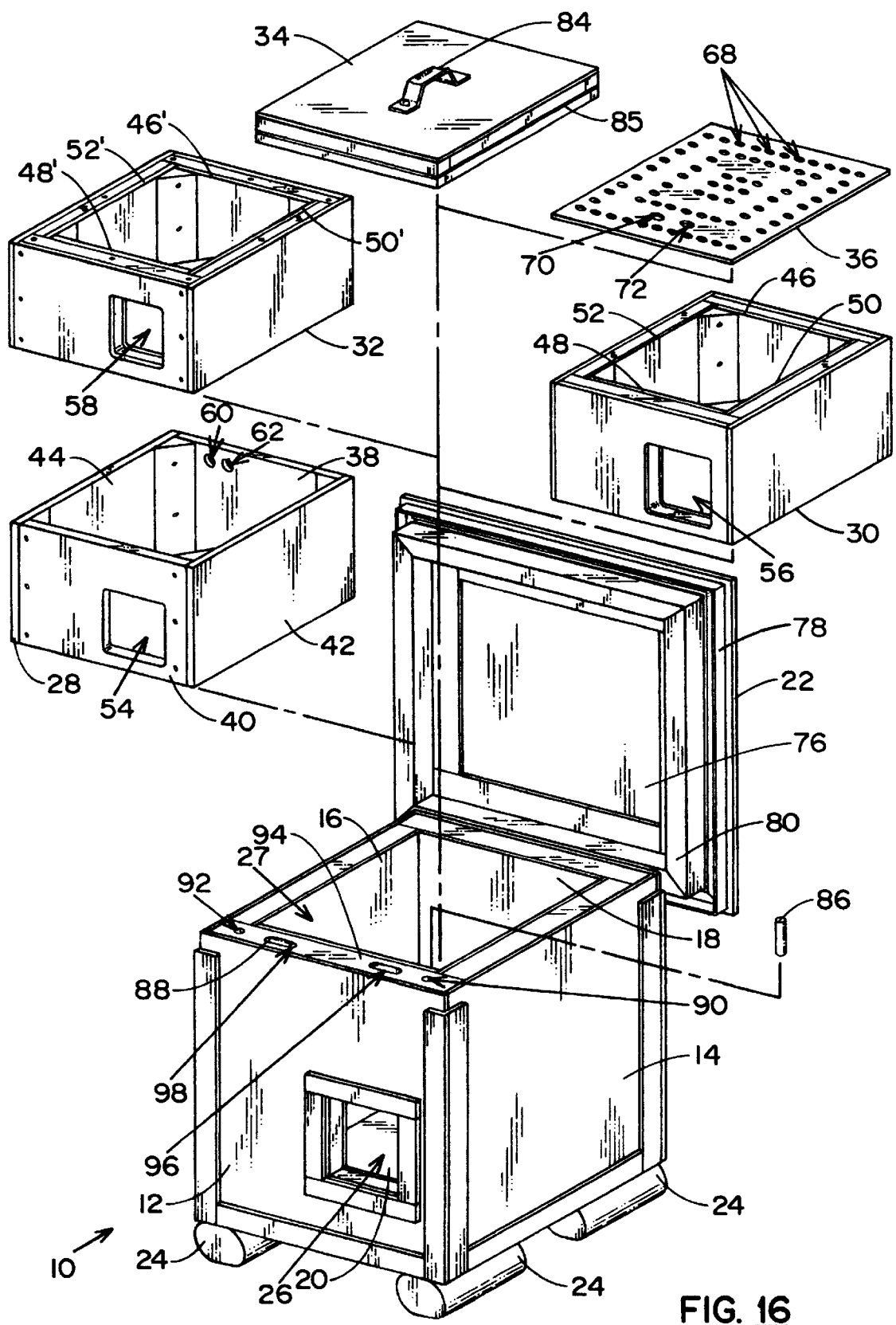
FIG. 16 is an exploded perspective view of the present invention showing the assembly of the various components of the present invention.

Each of the inserts 28, 30 and 32 are comprised of a rear wall 38, 38', 38" a front wall 40, 40', 40" and opposing sidewalls 42, 42', 42" and 44, 42', 42" extending between rear wall 38, 38', 38" and front wall 40, 40', 40", respectively. Each of these walls 38, 40 and 42 and 44 define external dimensions which are slightly smaller than the predetermined dimension of the house's cavity and an internal space of predetermined dimensions. As shown in FIG. 18, inserts 30 and 32 further include internal rear walls 46 and 46', front walls 48 and 48', and side walls 50, 50' and 52, 52', respectively. As best shown in FIGS. 4, 6 and 8, the internal dimensions of inserts 28, 30 and 32 vary according to the predetermined, internal dimensions, with insert 28 having the largest internal dimensions and insert 32 having the smallest internal dimensions. In addition, the walls of insert 30 and 32 are insulated so as to further enhance its heat retention properties.

Each insert 28, 30, and 32 further includes an opening 54, 56 and 58, respectively formed through the front wall 40 (40', 40") thereof. When positioned within cavity 27, the openings 54, 56, 58 are axially aligned with opening 26, thereby creating a continuous opening through which a dog may pass. The size of openings 26, 54, 56 and 58 are of varying dimensions but as small as possible to still permit a dog of predetermined size to comfortably pass therethrough, thereby minimizing heat loss through the openings.

Figure 5:
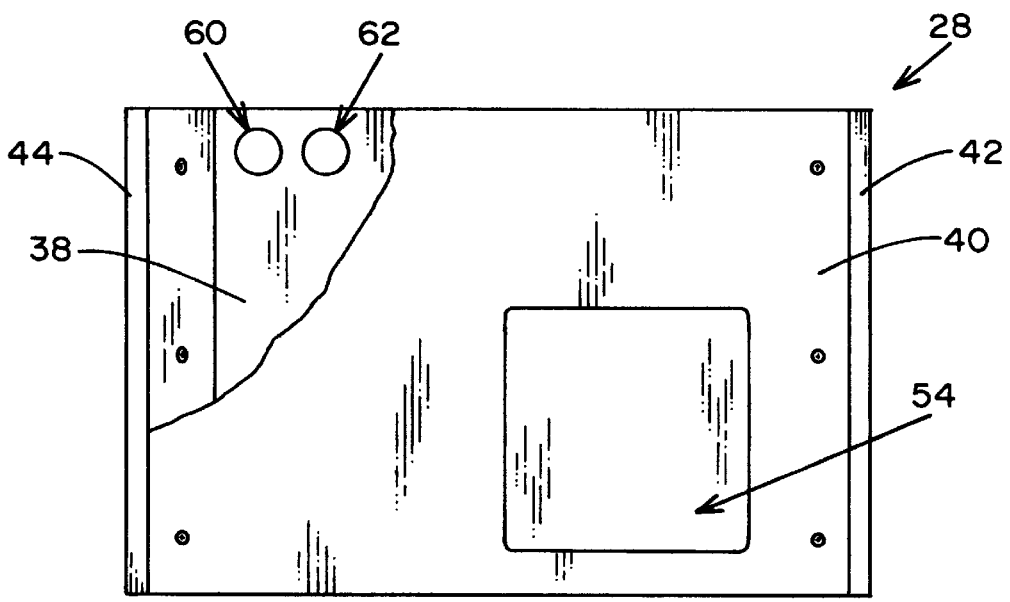
FIG. 5 is a front elevational view thereof with portions cut away to reveal certain internal features.

In order to ease the insertion and removal of inserts 28, 30 and 32 into and out of house 10, a pair of laterally spaced finger holes 60 and 62 are formed through rear wall 38 (see FIG. 5). By inserting a pair of fingers through holes 60 and 62, inserts 28, 30 and 32 can be easily grasped and lifted (the finger holes are not shown for inserts 30 and 32), thereby easing the process of positioning the insert in or removing it from house 10. Even without finger holes 60 and 62, the inserts 28, 30 and 32 may be easily removed by grasping walls 38, 40, 42, 44 and lifting upwardly.

After positioning one of inserts 28, 30 or 32 in house 10, cover 34 or 36 may be positioned in covering relation thereover. Cover 36 includes a plurality of perforations 68 and a pair of finger holes 70 and 72 formed therethrough. Perforations 68 permit air to continuously flow into and out of insert 28, 30 or 32, while finger holes 70 and 72 ease removal of cover 36 from house 10. Cover 34 includes a handle 84 attached to its outwardly facing surface to permit it to be easily removed from or positioned on one of the inserts and insulating 82 positioned between the cover's framing designated generally by reference numeral 85. While perforated cover 36 is desirable in warm weather, a solid cover 36' could be utilized in colder weather when heat retention is desired.

Once inserts 28, 30 and 32, and cover 34 or 36 is positioned within house 10, roof 22 may be closed or left in a propped open position. With specific reference to FIGS. 14–17, roof 22 is comprised of an outer board 74, an inner board 76 spaced from outer board 74 by framing 78, and a border 80 fixedly positioned about the perimeter of the inwardly facing surface of inner board 76. An insulating material 82 may be filled in the space between outer and inner boards 74 and 76, respectively, to further enhance the heat retention properties of house 10.

With reference to FIG. 17, roof 22 may be positioned in a terminal, complete covering relation to house 10 (this position not shown), in a propped open position (shown in solid lines), or in a terminal, completely open position (shown in phantom lines). When in a completely closed position, border 80 overlaps front wall 12, side walls 14 and 16, and rear wall 18, while in its completely open position, full access to the interior of house 10 is achieved, thereby easing the process on installing and removing inserts 28, 30 and 32, floor 34 and cover 36.

When roof 22 is in a propped open position, air is permitted to flow into and out of house 10. To maintain roof 22 in a propped open position, one or both of a pair of pegs 86 and 88 are positioned with one end in bored holes 90 and 92, respectively, which are formed in laterally spaced relation to one another in the upwardly extending edge 94 of front wall 12. With pegs 86 and 88 extending vertically upward, roof 22 may be positioned in a propped open position with border 80 resting upon the upper end of the pegs. When pegs 86 and 88 are not in use, they may be stored in elongated recesses 96 and 98, respectively, formed in edge 94.

While a preferred embodiment of the present invention has been set forth herein, it should be understood that the scope of the present invention is not limited thereby, but extends to the full extent defined by the following claims.

What is claimed is:

1. An improved animal house of the type having a floor, a plurality of walls of a first predetermined height extending upwardly from said floor, a roof mounted to one of said walls for movement between open and closed positions, and a first opening of first, predetermined dimensions formed through one of said walls for permitting ingress and egress of an animal into and out of said house, respectively, said walls and floor defining a first cavity of first predetermined length and width dimensions and a height corresponding to said first, predetermined height, and said roof extending in a first plane when in its said closed position, said improvement comprising:

(a) at least one modular insert unit adapted to be securely positioned within said first cavity of said house, and having a plurality of interconnected sidewalls corresponding in number to the number of said plurality of walls of said house, and being of second, predetermined height less than said first predetermined height, second length and width dimensions which are no greater than said first, predetermined length and width dimensions, whereby said modular insert unit may be positioned within said first cavity;

(b) said at least one modular insert unit further including a second opening of second, predetermined dimensions formed through one of said sidewalls, whereby said first and second openings are axially aligned when said modular insert unit is positioned within said first cavity of said house, and (c) a cover adapted to be removably mounted in covering relation to said at least one modular insert unit and extend in a second plane that is essentially parallel to and spaced from said first plane, whereby a second cavity is defined in the region between said roof, said cover, and said plurality of walls of said house.

2. The animal house of claim 1, wherein said first predetermined length and width dimensions are no greater than said second predetermined length and width dimensions, thereby permitting said at least one modular insert unit to be tightly positioned within said first cavity of said house.

3. The animal house of claim 1, wherein said cover includes a plurality of holes formed therethrough.

4. The animal house of claim 1, wherein said cover is solid.

5. An improved animal house of the type having a floor, a plurality of walls of a first predetermined height extending upwardly from said floor, a roof mounted to one of said walls for movement between open and closed positions, and a first opening of first, predetermined dimensions formed through one of said walls for permitting ingress and egress of an animal into and out of said house, respectively, said walls and floor defining a first cavity of first predetermined length and width dimensions and a height corresponding to said first, predetermined height, and said roof extending in a first plane when in its said closed position, said improvements comprising:

a) a first, modular insert unit adapted to be securely positioned within said first cavity, and having a first plurality of interconnected sidewalls corresponding in number to the number of said plurality of walls of said house, and being of second predetermined height less than said first predetermined height, second length and width dimensions, and a first, predetermined thickness;

b) a second, modular insert unit adapted to be securely positioned within said first cavity, and having a second plurality of interconnected sidewalls corresponding in number to the number of said plurality of walls of said house, and being of third predetermined height less than said first predetermined height, third length and width dimensions, and a second, predetermined thickness;

c) said first and second modular insert units including second and third openings, respectively, of second and third predetermined dimensions, respectively, formed through one of each of said first and second pluralities sidewalls, respectively, whereby said first opening is axially aligned with said second and third openings when said first and said second modular insert units, respectively, are positioned in said first cavity, and d) a cover adapted to be removably mounted in covering relation to said at least one modular insert unit and extend in a second plane that is essentially parallel to and spaced from said first plane, whereby a second cavity is defined in the region between said roof, said cover, and said plurality of walls of said house.

6. The animal house of claim 5, wherein said second and third predetermined length and width dimensions are essentially the same as said first predetermined length and width dimensions, thereby permitting either of said first and second modular insert units to be tightly positioned within said first cavity of said house.

7. The animal house of claim 5, where said cover includes a plurality of holes formed therethrough.

8. The animal house of claim 5, wherein said cover is solid.

9. The animal house of claim 5, wherein said first height dimension is greater than said third height dimension.

10. The animal house of claim 9, and further comprising a roof pivotally connected to one of said walls of said house, wherein said roof is movable between terminal open and closed positions with respect to said house, said terminal closed, position being when said roof is positioned in complete covering relating to said house and extending in a first plane.

11. The animal house of claim 10, and further comprising a cover adapted to be removably mounted in covering relation to said at least one modular insert unit and extend in a second plane that is essentially parallel to and spaced from said first plane, whereby a second cavity is defined in the region between said roof, said cover, and said plurality of walls of said house.

12. The animal house of claim 11, where said cover includes a plurality of holes formed therethrough.

13. The animal house of claim 11, wherein said cover is solid.

* * * * *